United States Patent Office 2,710,293
Patented June 7, 1955

2,710,293

BLOOD FRACTIONATION

Tillman D. Gerlough, Highland Park, N. J., assignor to Olin Mathieson Chemical Corporation, New York, N. Y., a corporation of Virginia No Drawing. Application October 30, 1953,
Serial No. 389,460

5 Claims. (Cl. 260—112)

This invention relates to blood fractionation, and has for its object the provision of an improved method for the fractionation of plasma to separate the albumin, gamma globulin, and other valuable fractions thereof.

Various methods for the fractionation of plasma have been developed, the most successful being based on the use of cold ethanol under precise conditions of pH, temperature, ionic strength, ethanol and protein concentration. These are described in the following sources, inter alia: U. S. Patent No. 2,390,074; U. S. Patent No. 2,469,193; J. A. C. S. 68, 459 (1946); and Encyclopedia of Chemical Technology, vol. 2 (1948) page 556. The method of almost universal choice for large-scale operation is that identified as "Method 6" and described in detail on pages 470 et seq. of the J. A. C. S. citation above. To facilitate comparison of the improved methods of this invention with this classical method, a flowsheet and outline of Method 6 are given hereinafter. [In said flowsheet (and throughout the specification and claims), all ethanol concentrations referred to are by volume (at 25° C.), and all temperatures are in centigrade. Also, the plasma referred to is that obtained from bleedings in which 500 ml. human blood is collected in 50 ml. 4% sodium citrate solution (or conventional acid-citrate-dextrose solution), the plasma separated from the cells by centrifugation and pooled.]

*Method 6*

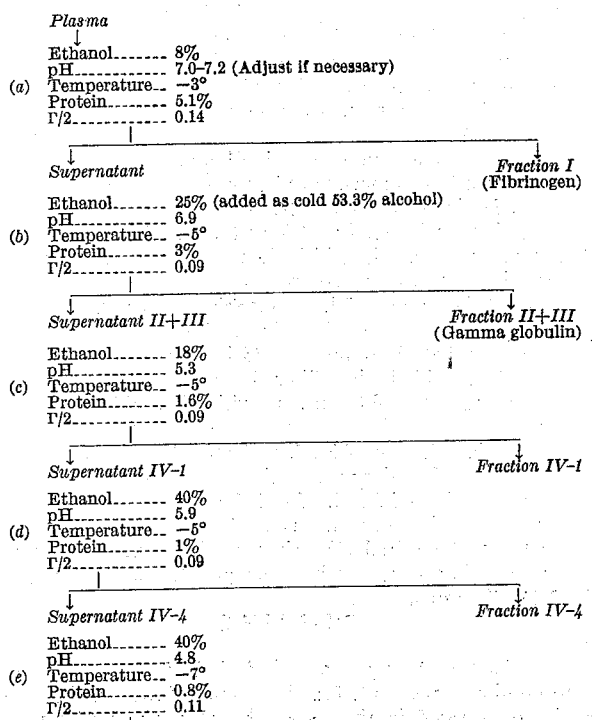

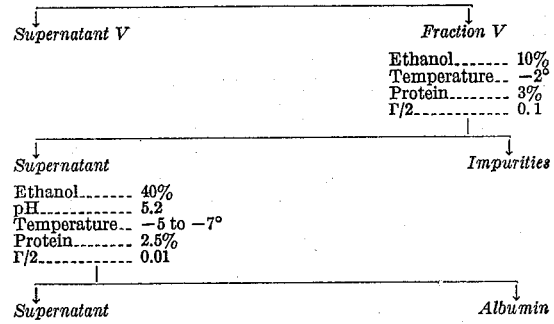

Outlining Method 6, in step *a* crude fibrinogen is removed from the plasma by adding thereto cold 53.3% ethanol to a final concentration of 8% ethanol, the temperature being maintained at about —2.5 to 3°, and the fibrinogen is separated by centrifugation. In step *b*, 53.3% ethanol is added to the supernatant to attain a concentration of about 25% ethanol, the temperature being maintained at about —5° and the pH being adjusted to about 6.9, if necessary. The resulting precipitate (Fraction II + III) contains the immune globulins as well as other physiologically important proteins (and is usually referred to as the gamma globulin fraction); it is removed by centrifugation at about —5°. In step *c*, a fraction consisting of most of the alpha globulins (and called IV-1) is precipitated by adding water to the 25% ethanol supernatant until a concentration of about 18% ethanol is reached, and the pH is adjusted to about 5.3, the temperature being maintained at about —5°. Fraction IV-1 is removed by centrifugation. In step *d*, the ethanol concentration of the 18% ethanol supernatant is increased to 40%, and the pH adjusted to about 5.9. Under these conditions, another fraction (IV-4) is precipitated, and is then removed by centrifugation. In step *e*, the 40% ethanol supernatant is clarified by filtration through a stainless steel filter press with asbestos mats, at —5° and the albumin fraction precipitated therefrom by adjustment of the pH to 4.8 ±0.3 (with acetic acid-sodium acetate buffer). The precipitated albumen fraction is then removed by centrifugation, and further purified by dissolving in 10% ethanol (step *f*), and reprecipitating by adjusting the ethanol concentration to about 40% at a pH of 5.2 ± 0.2 (step *g*). Except for the precipitation of Fraction I and the reprecipitation of albumin, the ionic strength throughout the operations is about .09.

The operation of the foregoing method at sub-zero temperatures on a large-scale requires a considerable amount of expensive stainless steel or glass-lined equipment, as well as trained operators. In view of the obvious need to expand production of such fractions as fibrinogen, gamma globulin and albumin, modification of this method to permit increased production without requiring expansion of plant or other facilities has been urgently sought. In the operation of said ethanol fractionation method, large volumes of solution must be handled and centrifuged for separation of all of the desired protein fractions, and it was obvious that if the volumes handled could be reduced markedly, increased production could be obtained in the same length of time and with the same equipment. However, in view of the substantially empirical nature of this fractionation procedure, and the fact that alteration of the proteins or of the compositions of the fractions must be avoided, it was not obvious how such reduction of volumes handled could be effected.

On further studying the influence of ionic strength, protein concentration, ethanol concentration, pH and temperature on the solubility of the Fraction II+III (gamma globulin), it was found that this fraction could be precipitated at a lower ethanol concentration (about 18–22%, preferably about 20%), and that at the same time, a much stronger alcohol could be used for this adjustment. Thus, it has been found that substantially anhydrous ethanol (say a 90–100%, preferably a 95% ethanol) can be used in place of the 53.3% ethanol used in Method 6. Operating in this manner (with the pH at about 6.6–7.0, preferably about 6.9), a very material reduction in the volume of solution handled and centrifuged in this step results, and this reduction in volume follows through in the subsequent steps involving handling and centrifuging of solutions—results in an increased capacity (for the same equipment) of about 51 to 77%. The following table shows the comparative volumes handled with Method 6 and with the methods of this invention.

|  | Method 6 (liters) | Improved Method | |
|---|---|---|---|
|  |  | Example 1 (liters) | Example 2 (liters) |
| Plasma | 1,000 | 1,000 | 1,000 |
| Supernatant I | 1,177 | 1,177 | 1,177 |
| Supernatant II+III | 1,873 | 1,345 | 1,345 |
| Supernatant IV-1 | 2,542 | (1) | 1,442 |
| Supernatant IV-4 | 3,754 | 2,238 | 2,123 |
| Supernatant V | 3,812 | 2,257 | 2,175 |
| 10% Rework | 2 820 | 2 820 | 2 820 |
| Supernatant V-R | 1,367 | 1,367 | 1,367 |
| Total Volume Through Centrifuges | 14,525 | 8,384 | 9,629 |

1 Fraction IV-1 and Fraction IV-4 removed in one centrifugation.
2 Filtered only.

The following examples are illustrative of the invention:

EXAMPLE 1

As indicated by the following flowsheet, the only material procedural distinctions between the method of this example and Method 6 are in step *b*, the other apparently material distinctions (e. g., 2.2% protein concentration and 0.11 ionic strength in supernatant II+III) being, of course, the mere result of the change in procedure made in step *b*. Accordingly, a detailed description of the steps other than *b* need not be included for completeness of disclosure; but such description is included in this example to make it unnecessary to refer back to a detailed disclosure of Method 6. The pH values given in the flowsheet are the final pH values; thus, adjustment of the pH to 6.76 in step *b* of this example followed by the ethanol addition results in a final pH of about 6.9.

*Method of Example 1*

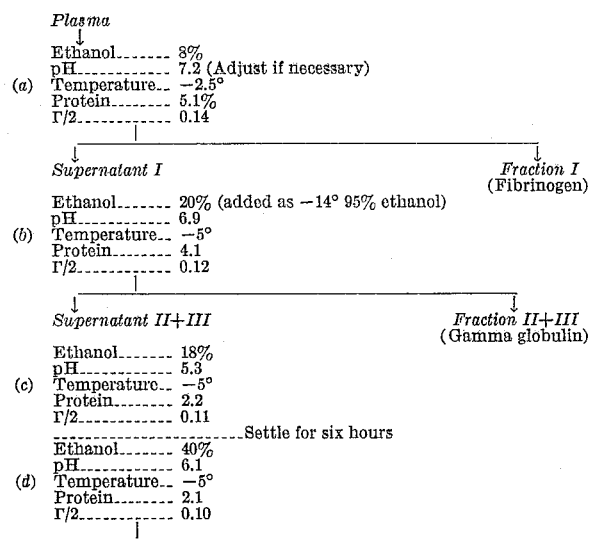

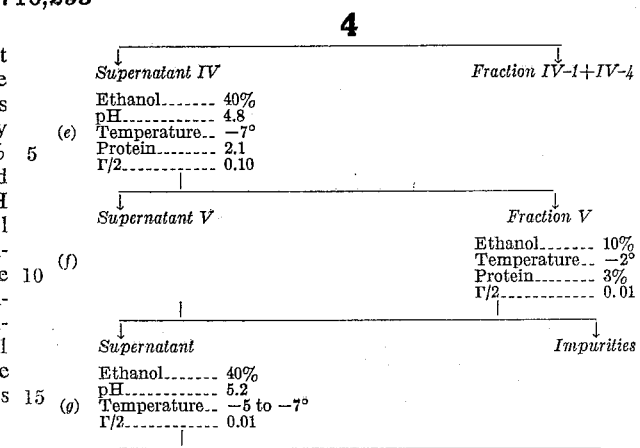

(*a*) 750 l. plasma is adjusted to pH 7.2 by addition of 2.6 l. sodium acetate-acetic acid buffer. The mixture is then brought to 8% ethanol concentration by addition of 132.8 l. 53.3% ethanol, while maintaining the temperature at −2.5° (the time of ethanol addition being two hours). The precipitate (Fraction I) is removed by centrifugation at the rate of about 60 liters per machine per hour at −2°.

(*b*) The supernatant (I), having a volume of about 870 liters, is adjusted to pH 6.76 by the addition of one liter sodium acetate-acetic acid buffer; and the ethanol concentration is brought to 20% by the addition of 140 liters of −14° C. 95% ethanol, the temperature of the mixture being maintained at −5° during the addition, and the time of ethanol addition being 2½ hours. The precipitate (Fraction II+III) is removed from the mixture by centrifugation at the rate of 30 l. per machine per hour, and held for further processing to obtain Fraction II (gamma globulin). (*c–d*) The supernatant (II+III), having a volume of about 965 liters, is brought to 18% ethanol concentration by the addition of 108 l. water; the pH is lowered to 5.3 by the addition of 3.5 l. sodium acetate-acetic acid buffer; the mixture is allowed to settle for 6 hours. The mixture is then brought to pH 5.9 by the addition of 85.5 liters of sodium bicarbonate-sodium acetate buffer, and stirred for one hour before the addition of ethanol. The ethanol concentration is raised to 40% by the addition of 488 l. of −14° C. 95% ethanol, the time of the addition being two hours, and the pH, after the ethanol addition, being 6.1. The mixture is stirred for 2 hours and then centrifuged at the rate of 30 liters per machine per hour to remove Fraction IV-1 and Fraction IV-4.

(*e*) The supernatant (IV) is filtered through a stainless steel asbestos-mat-type filter press, using a filter aid (e. g., Hyflo Supercel). The pH of the filtered supernatant is then lowered to 4.8 by the addition of 63 l. of sodium acetate-acetic acid buffer; and the crude albumin (Fraction V) is removed from the mixture by centrifugation at the rate of 30 l. per machine per hour.

(*f*) The crude albumin (about 52 kg. wet weight) is brought to a total volume of 645 l. at 10% ethanol concentration. This is then filtered through a stainless steel asbestos mat-type filter press (with filter aid), and the filtered 10% solution, (about 624 l.) is brought to pH 5.06 by the addition of 3.7 l. of 1 modal sodium bicarbonate. The ethanol concentration is then raised to 40% by the addition of 340 l. of −14° 95% ethanol, and the mixture centrifuged at the rate of 30 liters per machine per hour. The final albumin yield is about 50 kg. wet paste. After freeze-drying, the powder weights about 19.05 kilograms.

EXAMPLE 2

In Example 1, steps *c* and *d* of Method 6 are combined to eliminate one centrifugation step. However, the precipitate formed in the 18% ethanol solution of step *c* in Example 1 may be separated by centrifugation and the supernatant obtained (IV-1) further treated as in step *d* of Method 6. In such case, the protein concentration and ionic strength in the 40% ethanol treatment of step *d* is 1.8 and 0.1, respectively; and in step *e*, is 1.0 and 0.1, respectively. The various volumes involved in this modification of the procedure of Example 1 are indicated in the table given hereinbefore.

In each of the foregoing examples, the adjustment of the ethanol concentration from 20% in step *b* to 18% in step *c* may be omitted, i. e., merely the pH adjusted in step *c* to 5.3.

The various precautions and techniques employed in classical Method 6 are of course employed where required in the methods of this invention. Thus, the operations are in general conducted at the lowest convenient temperatures, to minimize the denaturation of the proteins; bacterial growth and its products are avoided (inter alia, by use of bacteria and pyrogen-free distilled water); and the reagents (such as alcohol) are added in such manner as to avoid local high concentrations, as by slow addition (e. g., through capillary jets) and/or with thorough stirring.

The various fractions obtained are further fractionated and/or purified and packaged in the conventional manner. Thus, Fraction II+III may be fractionated by Method 9 described in J. A. C. S. 71, 541 (1949) to obtain gamma globulin. It has been established to the satisfaction of the various governmental and other agencies concerned, as well as by wide-spread clinical use, that the gamma globulin and albumin fractions obtained by the methods of this invention are as safe and effective for their purposes as the corresponding fractions obtained by Method 6.

The ethanol used may be of various commercial grades and/or denatured, but the impurities or denaturant must be such as to be removable in a final operation such as freeze-drying. Also, other buffers or buffer systems may be employed, with the qualification that they either be readily removable during processing or acceptable to the clinician. The sodium acetate-acetic acid buffer system is preferred, with sodium bicarbonate preferred for increasing alkalinity.

The methods of this invention are applicable to the same extent (and with the same modifications) as Method 6 to the fractionation of human serum (eliminating fibrinogen-separation step *a*), or bovine plasma, for example.

The invention may be variously otherwise embodied within the scope of the appended claims.

I claim:

1. In the method of fractionating plasma, the steps of treating the plasma to precipitate a fraction consisting principally of fibrinogen, removing the precipitate, then adjusting the supernatant to a pH of about 6.6–7.0 and to an ethanol concentration of about 18–20% by addition of cold substantially anhydrous ethanol, and removing the precipitate.

2. The method defined by claim 1, in which the pH is about 6.8.

3. The method defined by claim 1, in which the ethanol concentration is adjusted to about 20%.

4. The method defined by claim 1, in which the adjustment is by addition of an about 95% ethanol.

5. The method defined by claim 1, in which the ethanol added is at a temperature of the order of −14°.

References Cited in the file of this patent

UNITED STATES PATENTS

| | | |
|---|---|---|
| 2,390,074 | Cohn | Dec. 4, 1945 |
| 2,437,060 | Williams et al. | Mar. 2, 1948 |
| 2,469,193 | Cohn | May 3, 1949 |

OTHER REFERENCES

Cohn et al., J. Am. Chem. Soc., vol. 62, pp. 3399 (1940).

Cohn et al., J. Am. Chem. Soc., vol. 68, pp. 470–2 (1946).

Deutsch et al., J. Biol. Chem., vol. 165, p. 25 (1946).

Deutsch et al., J. Biol. Chem., vol. 164, pp. 114–15 (1946).

Baudouin et al., Chem. Abstracts, vol. 42, p. 3013 (1948).

Anson et al., "Advances in Protein Chem.," vol. III, pp. 440, 448 (1947).